(12) United States Patent
Bosquet

(10) Patent No.: US 9,379,463 B2
(45) Date of Patent: Jun. 28, 2016

(54) ASSEMBLY COMPRISING AN ADAPTER AND A SMART CARD

(71) Applicant: Olivier Bosquet, Vitre (FR)

(72) Inventor: Olivier Bosquet, Vitre (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/357,858

(22) PCT Filed: Nov. 13, 2012

(86) PCT No.: PCT/FR2012/052612
§ 371 (c)(1),
(2) Date: May 13, 2014

(87) PCT Pub. No.: WO2013/072616
PCT Pub. Date: May 23, 2013

(65) Prior Publication Data
US 2014/0315399 A1 Oct. 23, 2014

(30) Foreign Application Priority Data
Nov. 14, 2011 (FR) ..................................... 11 60321

(51) Int. Cl.
G06K 19/077 (2006.01)
H01R 12/70 (2011.01)

(52) U.S. Cl.
CPC ........ *H01R 12/7005* (2013.01); *G06K 19/0772* (2013.01); *G06K 19/07739* (2013.01)

(58) Field of Classification Search
CPC ..................... G06K 19/0772; G06K 19/07739
USPC ........................................................ 235/492
See application file for complete search history.

(56) References Cited

U.S. PATENT DOCUMENTS 7,183,636 B1    2/2007  Boccia et al.
8,620,271 B2 *  12/2013 Tan et al. ...................... 455/411
(Continued)

FOREIGN PATENT DOCUMENTS

FR    2 794 264 A1   12/2000
FR    2 875 625 A1    3/2006
(Continued)

OTHER PUBLICATIONS

ETSI, ETSI TS 102 221, Oct. 31, 2010, v9.2.0. Retrieved from <http://www.etsi.org/deliver/etsi_ts/102200_102299/102221/09.02.00_60/ts_102221v090200p.pdf> on Jul. 23, 2015.*
International Search Report, dated Mar. 11, 2013, from corresponding PCT application.

*Primary Examiner* — Toan Ly
(74) *Attorney, Agent, or Firm* — Young & Thompson

(57) ABSTRACT

In an assembly including an adapter and a smart card, the outer dimensions of the adapter are compliant with the 3FF microcircuit card format, the format further defining the positioning and minimum dimensions of contact areas; the smart card includes a plurality of contact surfaces, the dimensions of which are greater than those defined by the 3FF format for the contact areas, the outer dimensions of the card being smaller than those of the 3FF format; and the adapter includes a recess, the outline of which is defined by a plurality of arms that surround the recess, the recess being shaped so as to receive the smart card so the contact areas of the adapter fit inside the contact surfaces of the smart card, each of the contact areas being off-center relative to each of the contact surfaces, so each arm has a width of 700 micrometers, ensuring mechanical stability.

20 Claims, 2 Drawing Sheets

(56) References Cited

U.S. PATENT DOCUMENTS

2007/0158440 A1* 7/2007 Nishizawa et al. .......... 235/492
2014/0117097 A1    5/2014 Bosquet

FOREIGN PATENT DOCUMENTS

FR      2 882 175 A1    8/2006
WO      2012/168666 A1  12/2012

* cited by examiner

ASSEMBLY COMPRISING AN ADAPTER AND A SMART CARD

BACKGROUND OF THE INVENTION

1. Field of the Invention

The present invention relates to an assembly formed by an adapter for a contact smart card and by the corresponding smart card, the adapter being intended to convert a first smart card format into a second smart card format.

2. Description of the Related Art

In particular, two standardized smart card formats exist for SIM (Subscriber Identity Module) cards, referenced in the ETSI 102 221 v.8.2.0 and ISO7816 standards:

- The 2FF format, also called ID-000, wherein the card body is delimited by a rectangular shape of 15 mm×25 mm×0.76 mm, with a shape key of 3×3 mm in one corner of the card body, and
- The 3FF format, also called Mini UICC, wherein the card body is delimited by a rectangular shape of 15 mm×12 mm×0.76 mm, with a shape key of 2.5×2.5 mm in one corner of the card body.

A larger card also exists, with the 1FF format also called ID-1, wherein the card body is delimited by a rectangular shape of 85.6 mm×54 mm×0.76 mm.

1FF, 2FF and 3FF cards comprise a plate, called a contact plate. This contact plate is generally equipped with eight contact surfaces commonly designated by the names C1 to C8. These contact surfaces can be distributed over two substantially parallel columns. A first column can comprise contacts C1 to C4 and a second column can comprise contacts C5 to C8. The ISO7816 standard specifically defines the dimensions of minimum contact areas that these contact surfaces must have, namely 2 millimeters long and 1.7 millimeters wide (by convention, the length is measured parallel to the largest dimension of the card and the width perpendicularly to this dimension). This standard also defines the positions relative to these contact areas as well as their dimensionings and positionings with respect to the card body. The contact surfaces, commonly called ISO contacts when they comply with the aforementioned ISO standard, have the aim of providing the electrical connection between an electronic chip, integral with the card, and a reading/writing device.

In practice the contact surfaces extend on each side beyond the contact areas defined by the standards, for example over distances substantially equal along the length, or along the width; it is then said that the contact areas are substantially centered on the contact surfaces (which equates to saying that the middles, of the width or of the length, are superimposed).

Thus, the contact surfaces correspond to effective surfaces whereas the contact areas correspond to the minimum theoretical sites described by the ISO7816 standard.

By way of information, the contact surfaces C1 and C5 are used for the power supply, where C1 corresponds to Vcc, also called "positive power supply" and C5 corresponds to GND, also called "ground".

The contact surface C2, also called RST, is used to reset the chip to zero.

The contact surface C3, also called CLK, acts as the clock of the chip.

The contact surface C7, also called I/O, is used for the inputs and outputs of the chip information.

The contact surfaces C4, C6 and C8 are intended for so-called "reserved" contacts, which have no particular functions. Today, these contacts C4 and C8 can be used for USB ports and the contact C6 for the SWP (Single Wire Protocol) communication protocol.

In the remainder of the description, it may be considered that contacts having an index have the same functions as those described above.

In the remainder of the description it will be considered that a substantially rectangular smart card or SIM card bearing the contact plate on its front face has the shape key at the bottom right of this card. By extension, the opposite face to the front face is the back face. It is possible to define the contacts C1 and C5 as being situated close to the upper edge (or at the top) of the card or of the contact plate, the contacts C4 and C8 as being situated close to the lower edge (or at the bottom), the contacts C1 to C4 as being close to the left edge and the contacts C5 to C8 as being situated close to the right edge.

A new smart card format has recently been developed wherein the dimensions and thickness are smaller than those of the card with the 3FF format. To do this, the contacts C4 and C8 have been moved between the columns of contacts C1 to C3 and C5 to C7 (see the as yet unpublished application PCT/FR2012/051292). The contact surfaces C1 to C3 and C5 to C7 are compliant with the contact areas of the ISO7816 standard. This new format, which can also be called micro-SIM (another possible name is 4FF), may comprise a card body delimited by a rectangular shape of 8.8 mm×12.3 mm×0.70 mm, with a shape key of 1.65×1.65 mm in one corner of the card body.

The tolerances of all the cards described above are in the order of 0.1 mm.

In order to render the various cards mutually compatible, card adapters exist that make it possible to convert a card into a different format. Thus a card can be read by a reading device initially provided for a card in a different format. For example, there are adapters for converting a card with the 3FF format into the 2FF format. Such an adapter can comprise a body whose dimensions are those of a 2FF card. The body comprises a recess shaped to receive a card with the 3FF format. The recess is formed so that the body of the adapter can surround the recess in order to ensure the rigidity of the adapter and/or the adapter plus card assembly. The recess is configured so that once the 3FF card is inserted into the 2FF adapter, the contact surfaces of the card with the 3FF format are compatible with the ISO contact areas of the card with the 2FF format.

It is desirable to make the contact surfaces of a card with a format whose outer dimensions are smaller than the 3FF format compatible, so that a card reader, for example with the 3FF format, can read at least the contacts C1 to C3 and C5 to C7. This compatibility can be achieved by way of an adapter, which can have mechanical stability problems with regard to the current configuration of the contact surfaces and areas.

The reason is that the contact areas C1 and C5 of a card in a format whose dimensions are smaller than the dimensions of a card with the 3FF format (for example the 4FF format previously mentioned in relation to the as yet unpublished application PCT/FR2012/051292) are in practice situated substantially 1.01 millimeters from the upper edge. The contact areas C1 and C5 of a card with the 3FF format are situated a maximum of 1.34 millimeters from the upper edge. This means that an arm with a width of substantially 330 micrometers of material is left for constituting the upper edge of the adapter. It is easily understood that an arm with such a small width can have mechanical stability problems, particularly during the operations of assembly and/or disassembly of the card and its adapter.

Such an adapter can therefore give rise to problems of mechanical stability and notably of robustness and/or of stretching and/or of breaking of the material.

BRIEF SUMMARY OF THE INVENTION

The subject of the invention is the provision of a card and its adapter that can resist the usual mechanical stresses of the field of application and particularly during the operations of assembly and disassembly of the cards from their supports and/or respective adapters to allow the connection of such a card, in a format smaller than the 3FF format, to a reading (or writing) device capable of reading/writing on cards in a larger format, with the 3FF format.

With this aim, the invention proposes an assembly comprising an adapter and a smart card wherein:

the smart card comprises a plurality of contact surfaces, the adapter has outer dimensions in accordance with a microcircuit card format equal to the 3FF format, this format furthermore defining the positioning and the dimensions of minimum contact areas C1$b$, C2$b$, C3$b$, C5$b$, C6$b$, C7$b$, the smart card comprises a plurality of contact surfaces C1, C2, C3, C5, C6, C7, the dimensions of which are larger than those defined by said format for said minimum contact areas, this card having outer dimensions smaller than those of the 3FF format, the adapter comprises a recess, the perimeter of which is defined by a plurality of arms that surround the recess, the recess being shaped to receive the smart card so that the contact areas defined by the format of the adapter fit inside the contact surfaces C1, C2, C3, C5, C6 and C7 of the smart card, each of the contact areas C1$b$, C2$b$, C3$b$, C5$b$, C6$b$, C7$b$ being eccentric with respect to each of the contact surfaces C1, C2, C3, C5, C6 and C7, respectively, so that each arm has a width of at least 700 microns sufficient for ensuring the mechanical stability of the adapter.

The positioning and dimensions of the contact areas can be defined by the ISO7816 and ETSI102 221 standards.

The term "eccentric" may be understood to mean that the geometrical center of each of the contact areas is eccentric with respect to each of the corresponding contact surfaces (and vice versa); if a direction such as the width of the 3FF format is considered, the eccentricity denotes the distance between the middle of the width of a contact area and the middle of the associated contact surface.

The fact of making the contact areas eccentric with respect to the contact surfaces can in particular make it possible to increase the surface of at least some of the contacts, and thus to facilitate the use of the contacts by various readers, which may where applicable be suited to different formats (at least one of which is the 3FF format).

The contact surfaces can be separate. The term "separate" is understood to mean that the contact surfaces are separated by a non-conductive area.

In particular, the plurality of the contact surfaces of the smart card can be eccentric in the direction from the contacts C3/C7 toward the contacts C1/C5 (i.e. along the width based on the convention indicated above).

Advantageously, the plurality of the contact surfaces can be eccentric by at least 200 micrometers.

In particular, the contact surfaces can be eccentric by 200 to 600 micrometers. More particularly, the contact surfaces can be eccentric by substantially 400 micrometers.

The dimensions of the contact surfaces are advantageously larger by at least 20% than those of the contact areas along at least one dimension of the card body, in this case the width of the card body, preferably by at least 30%, or even 40%. In the case of a width of 1700 microns for the height of the minimum contact areas, the aforementioned offset (or eccentricity) of 400 micrometers corresponds to contact surfaces of a width of at least 2500 micrometers or 1.47 times the width of the minimum areas.

The invention relates to the case of a format of a microcircuit card for the adapter which is chosen as being the 3FF format.

The reason is that it transpires that the basic problem lies in the conversion of a card with a format smaller than the 3FF format into a card with a format equivalent to the 3FF format. In the current state of the art, such a conversion entails problems, particularly concerning the robustness of the adapter enabling the first card format to be converted into the second card format.

Another subject of the invention is a smart card that can comprise a contact plate, which can comprise six contacts C1, C2, C3, C5, C6 and C7 wherein the surface of each of the contacts is larger than the surface of each of the contact areas of a card with the 3FF format, by being eccentric with respect to the latter.

In particular, the adapter can comprise a plurality of arms that surround the recess. At least one of the arms has a width smaller than the width of one of the other arms, while being larger than 700 micrometers, the contact areas being eccentric with respect to the contact surfaces opposite the direction of the arm that has the smaller width.

Such an adapter can notably make it possible to ensure optimal holding of the card while guaranteeing sufficient rigidity for conventional use of the adapter and/or the card/adapter assembly.

Arms with a width of at least 700 micrometers can notably ensure the cohesion of the adapter assembly with its card.

In particular, the width of each arm can lie between 700 micrometers and 3 millimeters.

Advantageously, the ratio of dimensions of the card and adapter assembly exhibits dimensions such that the surface of the card corresponds to at least ⅔ of the surface of the adapter.

BRIEF DESCRIPTION OF THE DRAWINGS

Other features and advantages of the invention will become apparent in the light of the following description, given with reference to the appended, non-limiting drawings, wherein.

DETAILED DESCRIPTION OF THE PREFERRED EMBODIMENTS

Figure 1:
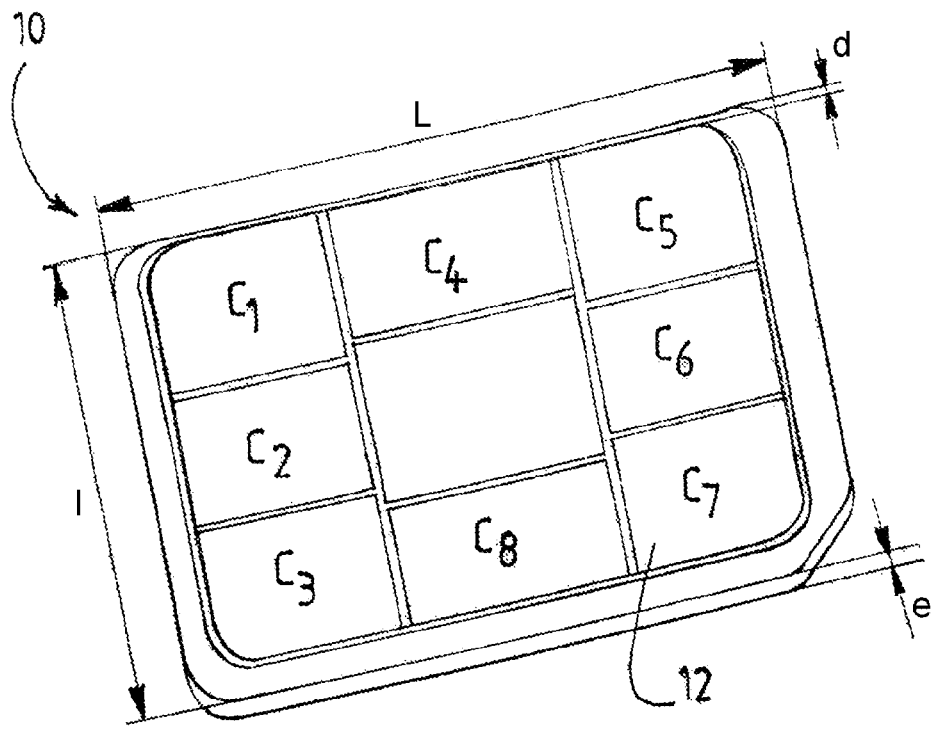
FIG. 1 is a perspective representation of a smart card in accordance with the invention, in a format smaller than the 3FF format.

FIG. 1 shows a smart card 10 in a format smaller than the conventional 3FF format. This card comprises a contact plate 12 equipped with eight contact surfaces numbered from C1 to C8.

This smart card is for example in accordance with the as yet unpublished application PCT/FR2012/051292.

The reader will recall that the definition of a format, notably the 3FF format, involves the definition of the minimum dimensions of several minimum contact areas C1$b$, C2$b$, C3$b$, C5$b$, C6$b$, C7$b$ as well as their positioning with respect to the outline of the body of such a card with this format. In the following, the dimensions of these minimum contact areas are those of the 3FF format.

Usually, the contact plate including the surfaces of the contacts preserves its dimensions when the format of the card body is changed, and in practice the sites of the minimum contact areas remain in the same places with respect to such a plate when the format changes. As the dimensions of the cards have decreased during the definition of the successive formats, the trend has been to situate the contact plate as close to the center as possible with respect to the body.

The dimensions of this card respectively comprise a length "L" of substantially 12.3 millimeters and a width "l" of substantially 8.8 millimeters. The thickness "e" is 0.70 millimeter maximum. The upper edge of the contacts C1 and C5 is situated at a distance "d", for example substantially equal to 1.01 millimeters, from the upper edge of the card. The term "substantially" is understood to mean that the tolerances are more or less 0.1 millimeter.

According to the embodiment shown, the assembly of the contact surfaces (or contacts) C1 to C3 and C5 to C7 of the smart card is eccentric by 400 micrometers in the direction of the upper edge of the card with respect to the positioning that the contact surfaces of a card with the 3FF format would have with respect to its body. This equates to saying that these contact surfaces are eccentric with respect to the contact areas associated with this 3FF format (see below) or to the contact areas that can be deduced for the format of the card shown based on the aforementioned rules.

It is understood that saying that the contact surfaces are eccentric with respect to the contact areas is equivalent to saying that these contact areas are eccentric with respect to the contact surfaces (by reversing the direction of eccentricity).

The contact surfaces C1 to C8 are produced from a conductive material such as copper. Taking a single contact surface as an example, the contact surface C1 for example, the copper is eccentric by at least 500 micrometers in the direction of the upper edge with respect to the positioning of the contact surface C1 of a card with the 3FF format. Indeed, the 500 micrometers can be broken down as follows: 400 micrometers intended for recentering and 100 micrometers intended for tolerance.

The copper of each contact surface C1 to C3 and C5 to C7 can jut out at least 100 micrometers beyond the other three edges of each of the contact areas C1b to C3b and C5b to C7b (not shown in this FIG. 1), so as to provide coverage for the totality of each contact area by the copper.

Figure 2:
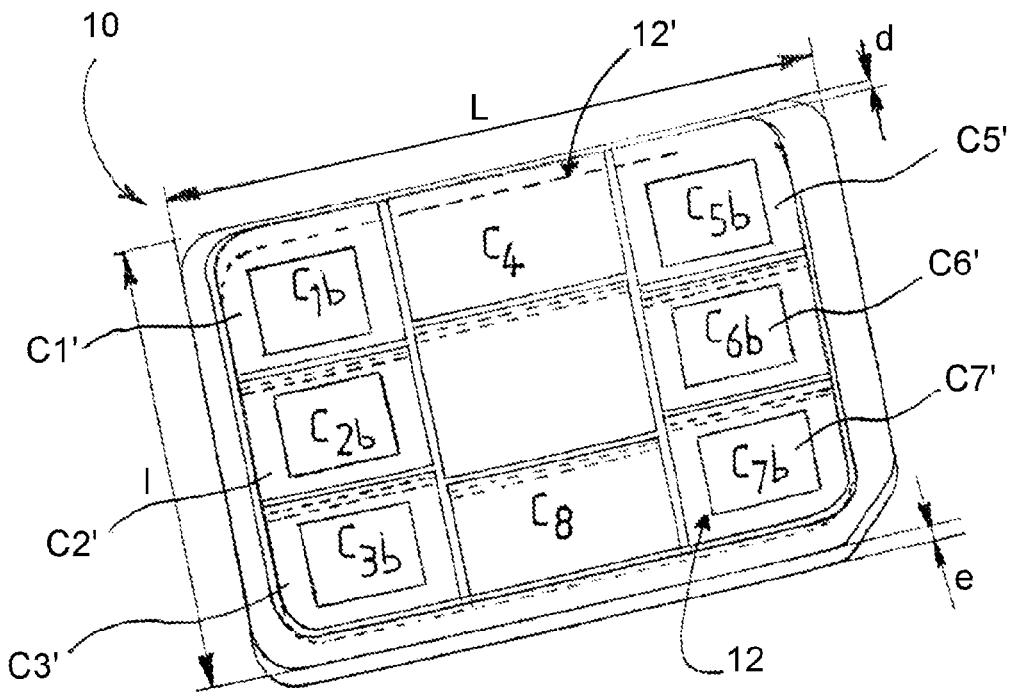
FIG. 2 is a perspective representation of a smart card in a format smaller than the 3FF format on which the contact plate in a previously proposed configuration and minimum contact areas are furthermore shown.
Figure 3:
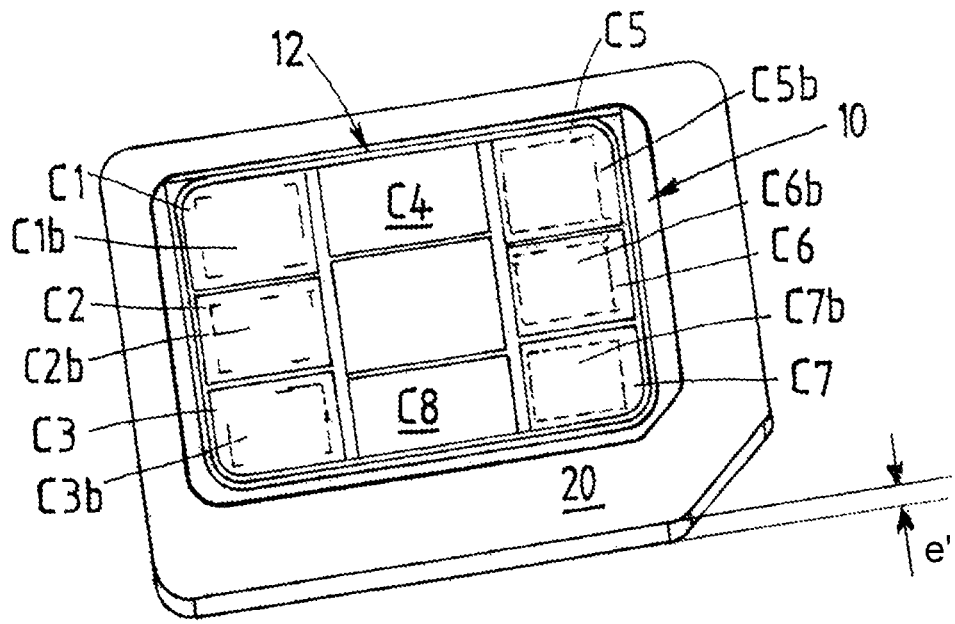
FIG. 3 is a perspective representation of the smart card in FIG. 1 placed in an adapter.

The fact of having increased the surface of the contacts in the direction of the upper edge of the smart card 10 according to the invention (it can also be said that these contacts have been moved to the top of the figure from positions centered on the minimum contact areas) can allow the design of an adapter 20 with the 3FF format as shown in FIGS. 2 and 3.

FIG. 2 shows the smart card in FIG. 1 on which the contact plate 12' of a type previously proposed in an unpublished application is shown in dotted lines. As can be seen, the sites of the contacts C1', C2', C3', C5', C6' and C7' are different and did not make it possible to guarantee good mechanical stability of the adapter once the card was arranged in an adapter with the 3FF format as shown in FIG. 3.

FIG. 3 shows the card 10 in FIG. 1, positioned in the recess 22 of the adapter 20 with the 3FF format.

The positioning and dimensions of the contact areas C1b, C2b, C3b, C5b, C6b and C7b are shown in the manner in which they are defined in the ISO7816 standard for the 3FF format.

Figure 4:
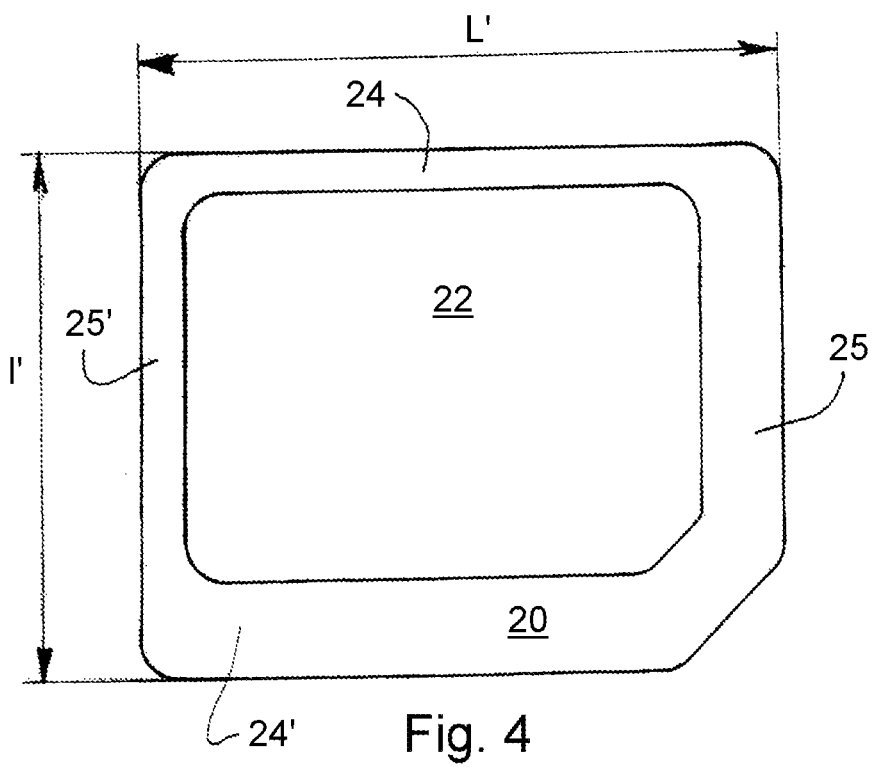
FIG. 4 is a top view of the adapter in FIG. 3.

FIG. 4 shows, in isolation, such an adapter 20 intended to receive a smart card 10 according to the invention.

The dimensions of the adapter 20 are those of a smart card with the 3FF format. It comprises a length "L'" of substantially 15 millimeters and a width "l'" of substantially 12 millimeters. The thickness "e'" is of substantially 0.76 millimeter.

This adapter 20 can comprise a recess 22 eccentric in the direction of the lower edge. The recess 22 thus formed can then be surrounded by enough material to ensure the rigidity of the adapter 20.

This recess 22 is notably formed between arms of upper and lower material 24 and 24' wide enough to ensure the mechanical stability of the adapter 20 in a conventional use. The term "conventional" is understood to mean that the adapter can for example be pre-formed in a card with the 1FF format. The adapter 20 is then pre-cut into the card with the 1FF format and remains integral with the latter by way of breakable links. It will be understood that the adapter 20 must be sufficiently robust so as not to break when the breakable links linking it to the card with the 1FF format are broken.

In this case, the upper arm 24 can have a width of at least 700 micrometers. The reason is that below this value the robustness of the adapter 20 is considered to be insufficient.

The upper arm 24 may have a width that may be as much as 3 millimeters.

As can be observed in FIGS. 2 and 3, the recess also comprises right and left arms 25 and 25', the width of which is at least as great as the width of the upper arm 24, namely at least 700 micrometers.

According to a first embodiment, not shown, the recess of the adapter can be a blind orifice that can comprise a means for holding the smart card. This holding means can be an adhesive element, for example double sided or adhesive transfer, positioned in the bottom of the recess. It is also possible to envision holding the card by inserting the latter into the recess with force, or else by means of a mortise and tenon assembly or by means of any other device that those skilled in the art wish to use and that does not risk being damaged during ordinary use of the adapter and smart card assembly.

The residual material of the blind orifice, which corresponds to the bottom of the adapter, has a thickness of substantially 60 micrometers (0.76 millimeter corresponding to the average thickness of the card with the 3FF format–0.70 millimeter, which can correspond for example to the maximum thickness of the smart card in a format smaller than the 3FF format).

The thickness of the bottom can notably depend on the means for holding the card in the recess. Thus, if the holding means is for example an adhesive with a thickness of 10 micrometers, the thickness of the bottom will be reduced by that amount.

Those skilled in the art will adapt the depth of the recess in such a way that once the smart card, in a format smaller than the 3FF format, is positioned in the adapter, the upper surface of the smart card and the upper surface of the adapter form a substantially plane surface.

According to a second embodiment, the recess 22 of the adapter 20 can appear in the form of an outlet opening. The smart card can be made integral with the adapter 20 by at least one holding means.

In particular, the holding means can be at least one mortise and tenon assembly, the tenon being able to be situated at the card 10 or the adapter 20, the mortise then being on the opposite part.

The holding means can also be an adhesive element, such as an adhesive film, which then closes up all or part of the orifice 20. The film, adhesive on a single face, can for example cover all or part of the back face of the adapter 20 so that the orifice 22 is at least partly covered by the adhesive. Thus, when the card 10 is positioned in the orifice 22, the adhesive part can hold the card 10 in position in the recess 22.

It can be envisioned that the adhesive only partly covers the orifice 22 in order to limit the risks of tearing the adhesive film, particularly when one wishes to withdraw the card 10 from the orifice 22. Such withdrawal can notably be carried out by pushing on the back face of the card 10.

In this second embodiment, it can be envisioned that the card has a thickness similar to the thickness of the adapter. It is also possible to envision adding a shim to the back of the card.

In this second embodiment, the card and the adapter 20 can be pre-cut into a card with the 1FF format.

The card 10 can be pre-cut on the inside, or on the outside, of the adapter 20.

Whatever the embodiment, the card 10 and the adapter 20 can be fabricated independently, for example by molding or by lamination, according to the techniques well known to those skilled in the art.

The invention as described above can notably make it possible to obtain a card plus adapter assembly that has qualities sufficient for ensuring the reading of a smart card in a format smaller than the 3FF format in a card reader with the larger format, with the 3FF format, while guaranteeing a robustness for the assembly that corresponds to current use.

In particular, the smart card in a format smaller than the 3FF format can be a smart card in a format in the process of standardization and which could be the 4FF format. For example, it can be a card having a rectangular shape with dimensions of less than 9 mm×13 mm for a thickness at most equal to the thickness of 0.76 mm of the cards in the 1FF, 2FF or 3FF format, for example a format of 8.8 mm×12.3 mm×0.70 mm, with a shape key of 1.65×1.65 mm in one corner of the card body.

The smart card could also be a card comprising six contacts and for example the contacts C1 to C3 and C5 to C7.

In the above, it has been indicated in a general manner that the contact surfaces have been made eccentric with respect to the contact areas; this eccentricity may or may not be the same for the various contact surfaces. Thus, one may choose minimal eccentricity for the contact surfaces situated near the edge toward which the contact surfaces are eccentric, and maximal eccentricity for the contact surfaces that are the most remote from this edge; for given eccentricity for the contact surfaces C2 and C6, this permits the surfaces C1 and C5 to be a few percent less eccentric, whereas the contact surfaces C3 and C7 can be a few percent more eccentric (the percentage drop for the contacts C1 and C5 can be the same as the percentage increase for the contacts C3 and C7. In the same way, the contact surfaces can have, in addition to their eccentricity, a variation in dimension in parallel with the eccentricity direction; this permits the surfaces C1 and C5 to become smaller than in a conventional contact plate (for example that of the 3FF format), by a percentage for example lying between 3% and 7% (for example 5%), whereas the areas of the contact surfaces C2 and C6 are preserved and the areas of the contact surfaces C3 and C7 are increased by a percentage for example between 3% and 7% (for example 5%), the contact plate preserving the same dimensions as in the known formats. It will be understood that to allow such eccentricities, identical or different according to the contacts in question, the spaces between these contact surfaces, in parallel with the eccentricity direction, can be reduced by a few percent.

Those skilled in the art will know how to adapt the dimensions of the card in the format smaller than the 3FF format in order to conform to any specifications of the standards relating to production.

The invention claimed is:

1. An assembly comprising:
   an adapter having an adapter thickness and, perpendicular to the adapter thickness, outer dimensions in accordance with a microcircuit card format equal to the 3FF format, the format further defining positioning and dimensions of minimum contact areas C1$b$, C2$b$, C3$b$, C5$b$, C6$b$ and C7$b$,
   a smart card comprising a plurality of contact surfaces C1, C2, C3, C5, C6 and C7 having dimensions larger than the dimensions defined by said format for said minimum contact areas, the smart card having a card thickness and, perpendicular to the card thickness, outer dimensions smaller than outer dimensions of the 3FF format,
   wherein the adapter comprises a recess having a perimeter defined by a plurality of arms that surround the recess, the recess being shaped to receive the smart card so that the contact areas C1$b$, C2$b$, C3$b$, C5$b$, C6$b$ and C7$b$ defined by the format of the adapter fit, perpendicular to the card thickness and the adapter thickness, inside the contact surfaces C1, C2, C3, C5, C6 and C7 of the smart card, each of the contact areas C1$b$, C2$b$, C3$b$, C5$b$, C6$b$ and C7$b$ being eccentric with respect to each of the contact surfaces C1, C2, C3, C5, C6 and C7, respectively, so that each arm has a width, perpendicular to the adapter thickness, of at least 700 microns sufficient to ensure the mechanical stability of the adapter.

2. The assembly as claimed in claim 1, wherein the plurality of contact surfaces of the smart card is eccentric in the direction from the contact surfaces C3 and C7 toward the contact surfaces C1 and C5.

3. The assembly as claimed in claim 2, wherein the plurality of the contact surfaces is eccentric by at least 200 micrometers.

4. The assembly as claimed in claim 2, wherein at least one of the arms that surround the recess has a width smaller than the width of one of the other arms, the contact areas being eccentric with respect to the contact surfaces in the direction of the arm that has the smaller width.

5. The assembly as claimed in claim 2, wherein the contact surfaces are, in the direction of eccentricity, larger than the minimum contact areas by at least 20%.

6. The assembly as claimed in claim 2, wherein the format of the adapter corresponds to the 3FF format.

7. The assembly as claimed in claim 2, wherein the ratio of dimensions of the card and adapter assembly exhibits dimensions such that the surface of the card corresponds to at least ⅔ of the surface of the adapter.

8. The assembly as claimed in claim 1, wherein the plurality of the contact surfaces is eccentric by at least 200 micrometers.

9. The assembly as claimed in claim 8, wherein at least one of the arms that surround the recess has a width smaller than the width of one of the other arms, the contact areas being eccentric with respect to the contact surfaces in the direction of the arm that has the smaller width.

10. The assembly as claimed in claim 8, wherein the contact surfaces are, in the direction of eccentricity, larger than the minimum contact areas by at least 20%.

11. The assembly as claimed in claim 8, wherein the format of the adapter corresponds to the 3FF format.

12. The assembly as claimed in claim 1, wherein at least one of the arms that surround the recess has a width smaller than the width of one of the other arms, the contact areas being eccentric with respect to the contact surfaces in the direction of the arm that has the smaller width.

13. The assembly as claimed in claim 12, wherein the contact surfaces are, in the direction of eccentricity, larger than the minimum contact areas by at least 20%.

14. The assembly as claimed in claim 12, wherein the format of the adapter corresponds to the 3FF format.

15. The assembly as claimed in claim 1, wherein the contact surfaces are, in the direction of eccentricity, larger than the minimum contact areas by at least 20%.

16. The assembly as claimed in claim 15, wherein the format of the adapter corresponds to the 3FF format.

17. The assembly as claimed in claim 1, wherein the format of the adapter corresponds to the 3FF format.

18. The assembly as claimed in claim 1, wherein the ratio of dimensions of the card and adapter assembly exhibits dimensions such that the surface of the card corresponds to at least ⅔ of the surface of the adapter.

19. The assembly as claimed in claim 1, wherein the microcircuit card has dimensions equal to no more than 13 mm×9 mm.

20. The assembly as claimed in claim 1, wherein the eccentricities of the contact surfaces C1 and C5 are smaller than the eccentricities of the contact surfaces C2 and C6, which are smaller than the eccentricities of the contact surfaces C3 and C7.

\* \* \* \* \*